Feb. 17, 1953 — R. R. JOHNSON — 2,628,500
APPARATUS FOR DETERMINING LIQUID LEVELS
Filed Sept. 16, 1948 — 4 Sheets-Sheet 4

Russell R. Johnson Inventor
By W. O. J. Heilman Attorney

Patented Feb. 17, 1953

2,628,500

UNITED STATES PATENT OFFICE 2,628,500

APPARATUS FOR DETERMINING LIQUID LEVELS

Russell R. Johnson, Elizabeth, N. J., assignor to Standard Oil Development Company, a corporation of Delaware Application September 16, 1948, Serial No. 49,621

7 Claims. (Cl. 73—299)

The present invention relates to a means for determining fluid levels. More particularly the invention relates to such means whereby the gravimetric pressures of one or more fluids contained in a process vessel may be utilized to provide for determination of fluid levels within the process vessel or for determination of the level of an interface between such fluids in the vessel.

It is an object of the invention to provide for such determinations with reference to a fixed interface between a process fluid and a seal liquid of different specific gravity and substantially immiscible with the process fluid. Another object of the invention is to permit visual determination of fluid levels where the process fluid normally tends to interfere with visual inspection because of high viscosity, corrosiveness, or because of foreign matter present in the fluid.

The invention and its objects may be fully understood from the following specification when read in conjunction with the accompanying drawings, in which Figure 1 is a substantially diagrammatic showing of the apparatus as applied for the determination of an interface between two process fluids, the elements being shown in vertical section;

Figure 1:
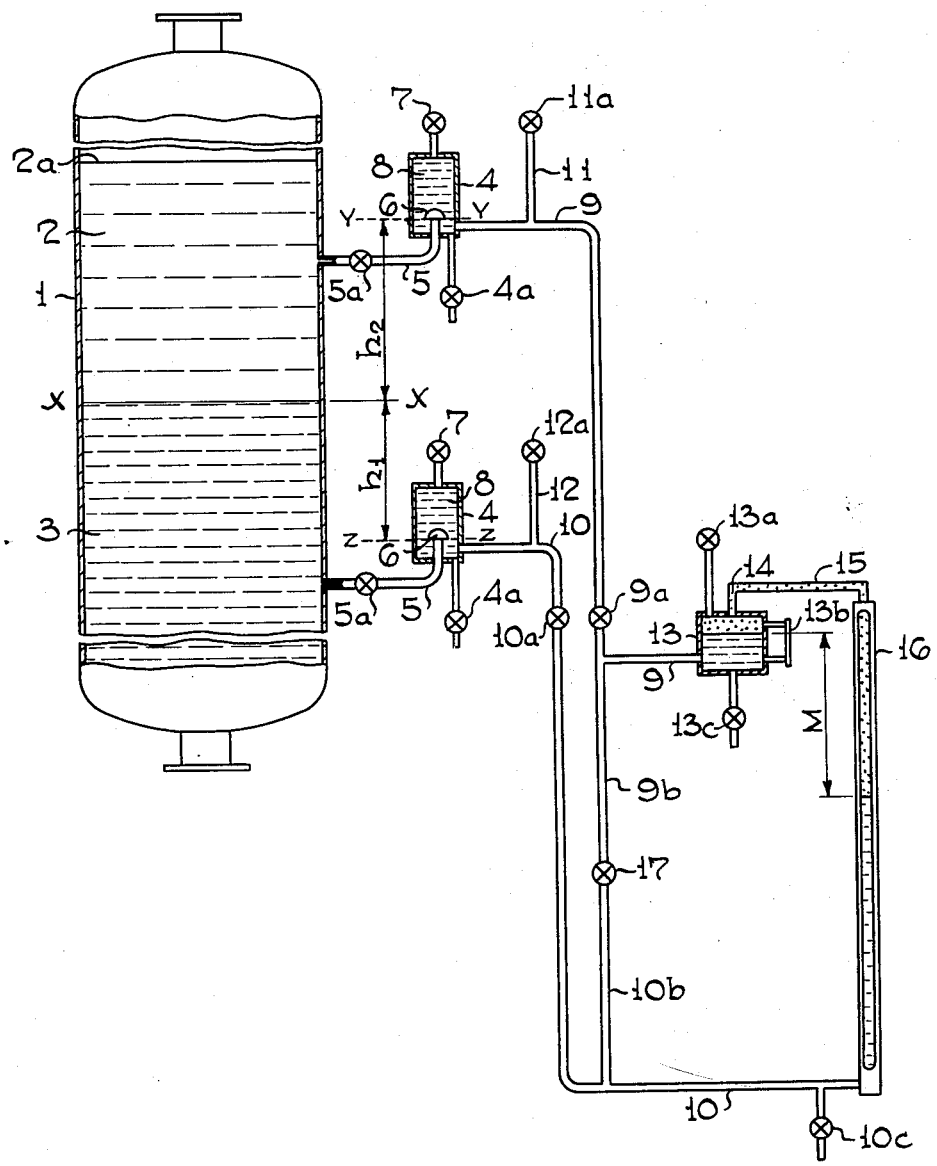

In the apparatus shown by the drawings, the numeral 1 indicates a portion of a process vessel containing process fluids 2 and 3. Normally, both fluids may be liquids of different specific gravity and substantially immiscible, one with another, being contained in the vessel 1 with an interface X—X between them. Under certain conditions of operation however, the fluid 2 may be gaseous in form. The numeral 2a designates an upper level for the body of fluid above the interface X—X, or of a single fluid in the vessel 1.

For the purpose of determining the level of the interface X—X in the process vessel 1, shown in Figure 1, a pair of receiver vessels or seal pots 4 are connected into the process vessel 1 by means of lines 5, containing valves 5a. These pots 4 are disposed in vertically spaced relation with reference to the process vessel so that any normally anticipated variation of the level of interface X—X may be contained between the respective openings of the lines 5 into the process vessel.

In each of the pots 4 the line 5 extends through one end wall portion, as shown, the bottom end wall portion, opening into the pot in spaced relation to the wall portion through which extended, and provided with a trap element 6 opening into the seal pot member 4. Each seal pot 4 is provided with a vent valve 7 which may be utilized for filling the pot with a seal liquid 8 of different specific gravity than the process fluids in the vessel 1, and substantially immiscible with such fluids. Under ordinary circumstances however, the valve 7 will be used to relieve any undesirable accumulation of vapors or gases in the receiver or pot 4.

Opening through a side wall portion of each of the receivers or seal pots 4 at a level intermediate that of the terminal level of the line 5 within the pot 4, and the end wall portion through which said line 5 enters the pot, are conduits 9 and 10 provided with valves 9a and 10a. Lines 11 and 12, having valved openings 11a and 12a, respectively, communicate with conduits 9 and 10, and are normally used for the purpose of introducing the seal liquid 8. Conduit 9 communicates with the lower portion of a reservoir 13 for a manometer liquid 14, the upper portion of the reservoir 13 communicating, by means of line 15, with the upper end of a manometer 16. A valved line 13a is provided for filling and replenishing the manometer liquid. The reservoir 13 should be of a transparent material or be provided with a gauge or sight glass, such as 13b, to permit visual inspection of the interfacial level of liquids in the reservoir. In the apparatus as shown, the manometer liquid 14 is of lighter specific gravity than, and substantially immiscible with the seal liquid 8, but need have no specific relation in gravity or miscibility with either of the process fluids. The conduit 10 communicates with the lower end of the manometer 16, and the conduits 9 and 10 are interconnected by means of branched lines 9b and 10b through a manometer balancing valve 17.

In the apparatus as illustrated, the seal liquid 8 is of higher specific gravity than either of the process fluids 2 and 3. Under such circumstances the fluid 2, with the valve 5a open, will fill the upper line 5 and establish an interface with the seal liquid 8 in the trap 6, along the line Y—Y in upper pot 4, as shown. Similarly, the process fluid 3 will enter the lower pot 4 through the lower line 5, and establish an interface with the seal liquid 8 in the trap 6 wherein, along the line Z—Z. In both instances the trap member 6 is so arranged with reference to the terminal end of a line 5, that the interface level between the process fluids and the liquid 8, in the respective upper and lower seal pots, will be established at the level of the terminal ends of lines 5 in the seal pots 4.

In commencing operation with the system as described, the valves 5a will be closed and the system drained of all contents, as by means of drain valves 4a, 13c and 18c. The valves 9a and 10a will then be closed, and the manometer reservoir 13 filled with a manometer liquid 14. Next, the valves 9a and 10a will be opened, as will be the balancing valve 17 and the system filled with seal fluid 8. The balancing valve 17 will then be closed and valves 5a opened. Upon opening of the valves 5a the interface levels Z—Z and Y—Y will be established in the trap elements 6 and the seal liquid 8 will seek a level in each of the manometer elements 13 and 16, depending upon the gravimetric pressures exerted by the fluids contained in the process vessel.

The interfacial level between the manometer liquid 14 and the seal liquid 8 having been established in the reservoir 13, and the manometer 16, the existing level of the interface X—X in the process vessel 1 may be calculated from the following formula:

$$h_2 = \frac{M(D_3 - D_4) - (h_1 + h_2)(D_3 - D_2)}{(D_2 - D_1)}$$

in which:
1. $h_1$ is the distance from the interface Z—Z in the lower receiver 4, and the interface X—X in the process vessel 1;
2. $h_2$ is the distance between the interface Y—Y, in upper receiver 4, and the interface X—X in the process vessel 1;
3. M is the distance between the interface between the manometer liquid 14 and the seal liquid 8 in manometer 16, and the interface between said liquids in the reservoir 13;
4. $D_1$ is the density of the process liquid above the interface X—X in the process vessel 1;
5. $D_2$ is the density of the process liquid below the interface X—X in the process vessel 1;
6. $D_3$ is the density of the seal liquid 8; and
7. $D_4$ is the density of the manometer liquid 14.

In this formula the sum of the distances $h_1$ and $h_2$ is equal to the fixed and known distance between the interfacial levels Y—Y and Z—Z in the upper and lower pots 4, respectively. The distance M may be determined by measurement of the distance between the interfacial levels of the manometer and seal liquids in the manometer 16 and the reservoir 13, respectively. The densities of the respective fluids will, of course, be predetermined and known. Thus, the distance $h_2$ being determined by calculation according to the formula may be subtracted from the total known distance between the interfaces Z—Z and Y—Y to exactly determine the level of the interface X—X in process vessel 1 with reference to either of the interfacial levels in the seal pots 4. Variations of the interfacial level X—X may be similarly determined or, by precalculation of any given number of possible variations, the tube of manometer 16 may be suitably impressed or marked with indicia such that a direct reading of the interfacial level X—X may be obtained.

Figure 2:
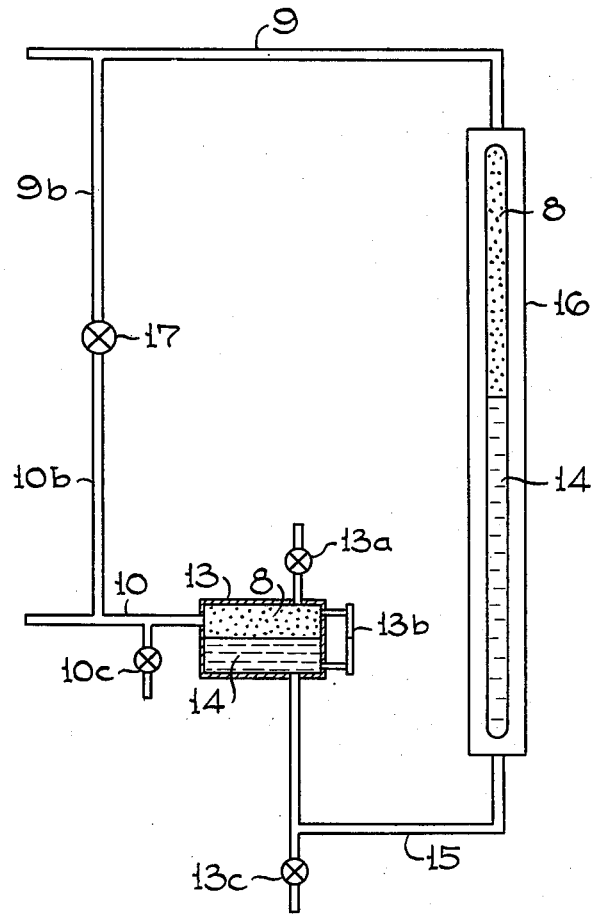
Figure 2 is a similar view of a portion of the apparatus, according to Figure 1, illustrating an alternate arrangement of certain elements.

In the alternate arrangement illustrated by Figure 2, provision is made for the use of a manometer liquid which is heavier than the seal liquid. As shown, the reservoir 13 is connected to the conduit 10, which enters the reservoir adjacent the upper end thereof. The line 15 in this instance opens from a lower portion of the reservoir 13, into the lower end of the manometer 16, the upper end of the manometer 16 being connected to the conduit 9.

Figure 3:
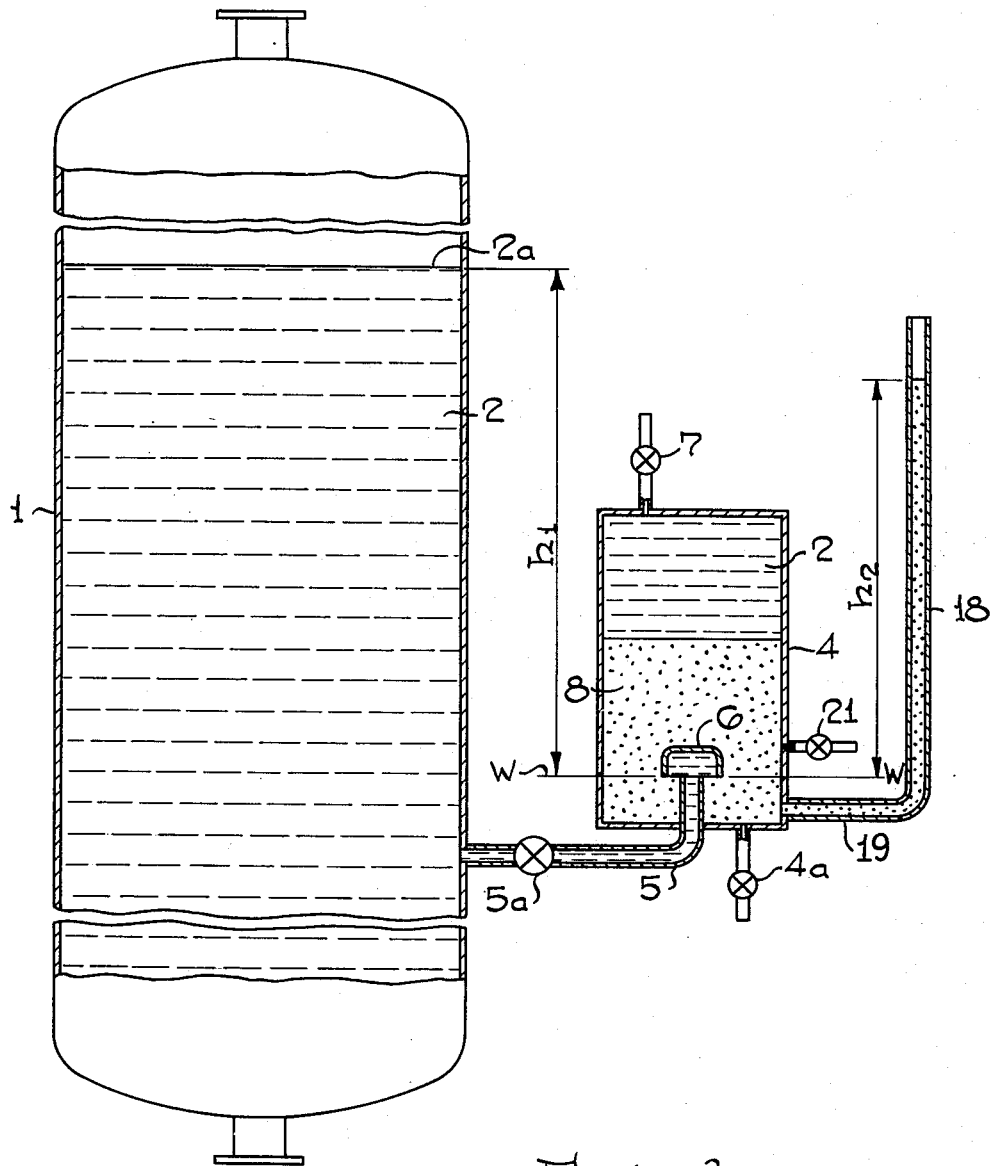
Figure 3 is a substantially diagrammatic showing of another application of the invention.

In Figure 3 is illustrated an arrangement in which only the upper level of a single process fluid contained in the process vessel 1 is to be determined. In such a situation, a single seal pot is utilized to which is connected a manometer 18, a connecting line 19 entering the pot 4 through a side wall portion, at a level intermediate that of the interface W—W and the end wall portion through which the line 5 enters the pot. In this arrangement the seal liquid 8 functions as well as the manometer fluid, no separate manometer liquid being used.

In general, the operation of this form of the invention is comparable to that of the apparatus illustrated by Figure 1. The seal pot 4 is filled by means of the valve 7 with a seal liquid, in this instance, heavier than the process liquid 2, the valve 5a being closed. Upon opening the valve 5a, the head of the fluid 2 in the process vessel 1 will be balanced against the head of liquid in the manometer 18. As in the operation of the apparatus described with reference to Figure 1, a fixed interface will be established in the trap 6 between the process fluid 2 and the seal liquid 8. Any increase or decrease of level 2a will then result in the imposition of a greater or lesser pressure of the process liquid upon the seal liquid. In the first instance this will result in the process fluid being forced into the seal pot 4 through the trap 6 where, being lighter than the seal liquid, it will rise to the upper portion of the pot, displacing seal liquid from the pot into the manometer tube 18, raising the level of liquid therein. A decrease in the level 2a of fluid 2 in the process vessel 1 will decrease the pressure of such fluid upon the seal liquid 8 resulting in withdrawal of the seal liquid from the pot 4 through the trap 6 and line 5 into the process vessel 1, the liquid withdrawn being replaced in the pot 4 by liquid from the manometer tube 18, thus lowering the level of liquid in the tube. Under normal circumstances, the introduction of the process fluid into the pot 4 or the withdrawal of seal liquid therefrom will be in very small volume, but in any event the introduction of process fluid into the pot 4 or the withdrawal of seal liquid therefrom will not affect the operation of the device until the level of the seal liquid reaches the interface W—W. At that point the seal pot 4 should be drained and refilled with fresh seal liquid.

As in the operation previously described with reference to Figure 1, the level 2a of the fluid 2 in the process vessel 1 may be determined from the level of liquid in the manometer 18 by a simple calculation based on the formula $$h_1 = h_2 \frac{D_2}{D_1}$$

in which:
1. $h_1$ is the distance between the interface W—W and the process fluid level 2a;
2. $h_2$ is the distance between the interface W—W and the level of liquid in the manometer 18;
3. $D_1$ is the density of the process fluid 2; and
4. $D_2$ is the density of the seal liquid 8.

With the interface W—W fixed and known, the distance $h_2$ may readily be determined by measurement of liquid in the tube 18 with reference to interface W—W. In a situation where the pressures above the fluids have a negligible differential or are equal the distances, $h_1$ and $h_2$ will be inversely proportional to the fluid gravities.

Figure 4:
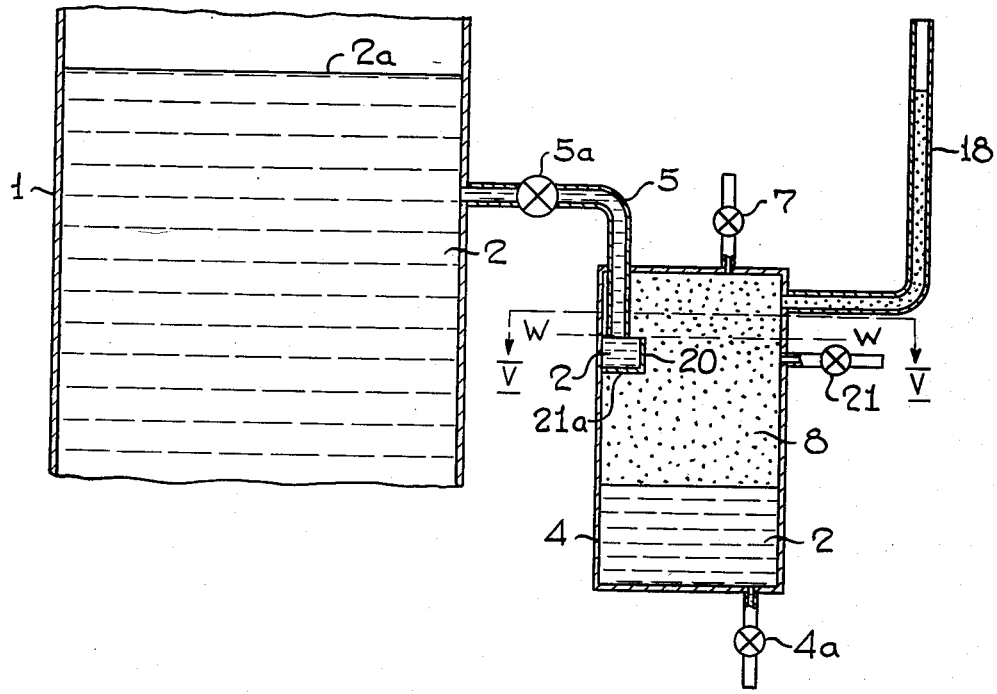
Figure 4 is a similar view of an alternate arrangement of the apparatus as illustrated in Figure 3.
Figure 5:
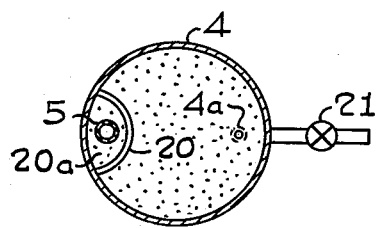
Figure 5 is a cross-section through the seal pot along the line V—V of Figure 4.

The apparatus shown by Figures 4 and 5 illustrates the arrangement of elements required when a seal liquid is used which has a lower specific gravity than the process liquid 2. Figure 4 and Figure 5 also illustrate another form of trap usable according to the present invention. In this form the trap is a substantially semi-circular portion of a cylindrical member, indicated by the numeral 20, secured to a side wall portion of the seal pot 4 in spaced relation to one end wall portion, the space thus defined by member 19 being closed at one end by a cover element 20a. The line 5 is introduced through such end wall portion in close proximity to the side wall of the pot 4 at a mid-point of the space defined by the element 19. Preferably the line 5 is secured to the side wall of the pot 4. As previously disclosed, the inner end of the line 5 terminates in the same plane with the open end of the element 20, whereby in operation an interface W—W is established and between the seal liquid 8 and a process fluid 2 in such predetermined plane. In each of Figgures 3, 4 and 5 the numeral 21 designates a try-cock used to determine the lower or upper limit of seal fluid in the pot 4. When process fluid flows from the try-cock 21 the seal pot 4 should be refilled.

When, as illustrated in Figures 4 and 5, a seal liquid is used which is of lower specific gravity than the process fluid, the seal pot must be inverted as shown. Under such circumstances the trap element is disposed adjacent to and in spaced relation to the upper end wall portion of the seal port 4 with the line 5 entering through such upper end wall portion and the manometer 18 opening into the seal pot adjacent the upper end above the trap and extending upwardly therefrom. In all other respects the construction and operation of the apparatus remains the same as described with reference to Figure 3.

A principal advantage of the present invention lies in the provision of a fixed and known level for the interface beteween a process liquid and a manometer or seal liquid in the seal pot element 4, which level may be used as a reference point for measurement of a process fluid level under any circumstances of operation. For example, in the apparatus as shown by Figure 1, if the process fluids are phenol or oil, a change of one inch in the level of the interface X—X in process vessel 1 would result in a change in differential pressure equivalent to only 0.1 inches of water. Any uncertainity or variation in the location of a reference point such as the interfaces Z—Z or Y—Y in the seal pots 4 would make it practically impossible to determine such a small variation in the interface X—X. Other uses for apparatus of the character described, include measurement of pressures in vapors which are near the dew-point where the use of a sealing system is desirable to prevent accumulation of condensate in the lines of the equipment utilized for measurement.

Various materials may be utilized as the seal liquid material 8, and also as a manometer liquid material 14. A principal requirement in either instance is that they be clean, and of a substantially stable nature to permit visual determination of their levels in the manometer tubes 16 and 18. As previously stated, the seal liquid material must also be substantially immiscible with the process fluids with which it comes in contact, and of a different specific gravity, and the manometer liquid material must have a substantially similar relationship to the seal liquid, but not essentially with reference to the process fluids.

In the operation set forth with reference to Figure 1, for example, the seal liquid may be a silicone oil, particularly one known as DC710, having a specific gravity of 1.11 at 25° C., and which is an organo-silicon oxide polymer. In such case the manometer liquid may be water, preferably containing a dye to improve visibility of the interface. Using the apparatus shown according to Figure 2, the manometer liquid may be glycerine, preferably dyed, or mercury may be substituted for a true liquid. A silicone oil may also be employed in the apparatus according to the other drawings, provided that the process fluid is substantially immiscible therewith, and of higher or lower specific gravity.

What is claimed is:

1. Apparatus for indicating the level of a process fluid in a process vessel, comprising a closed receiver for a seal liquid substantially immiscible with the process fluid, and of different specific gravity, a body of seal liquid in said receiver, a conduit having an open terminal end disposed at a predetermined level within the receiver, extending outwardly through an end wall thereof into communication with a process fluid in said vessel, a trap shield element having a closed end and an open end facing the terminal end of said conduit, with said conduit terminal end and the open end of said shield element disposed in the same plane and thereby establishing a fixed interface between the seal liquid and the process fluid, and manometer means indicating the gravimetric pressure of process fluid in the vessel above said interface upon the seal liquid communicating with said receiver through a side wall thereof at a level between that of the terminal end of the conduit and the end wall of the receiver through which said conduit is extended outwardly.

2. Apparatus according to claim 1, in which the seal liquid is of higher specific gravity than the process fluid with which said conduit and receiver are in communication, said conduit extending outwardly through the lower end wall of the receiver.

3. Apparatus according to claim 1, in which the seal liquid is of lower specific gravity than the process fluid with which said conduit and receiver are in communication, said conduit extending outwardly through the upper end wall of the receiver.

4. Apparatus for indicating the interfacial level between two substantially immiscible process fluids in a process vessel, comprising a pair of closed receivers for a seal liquid substantially immiscible with either process fluid and of different specific gravity, disposed in spaced relation vertically of the process vessel, a conduit having an open terminal end disposed at a predetermined level within the upper receiver, extending outwardly through an end wall thereof into communication with a process fluid in the upper portion of said vessel, a similar conduit similarly disposed and connecting the lower receiver with a process fluid in the lower portion of said vessel, trap shield elements each having a closed end and an open end facing over a terminal end of one of said conduits within each receiver, each conduit terminal end and the open end of a shield element disposed in the same plane and thereby establishing a fixed interface between the respective process fluids and the seal liquid in each receiver, and manometer means integrating the gravimetric pressures exerted at the respective interfaces established within each of said receivers, connected and in communication at one end with the upper receiver, and at the other end with the lower receiver at levels between those of the terminal ends of said conduits in the respective receivers, and the end walls thereof through which said conduits are extended outwardly.

5. Apparatus according to claim 4, in which said manometer means comprises a reservoir for a manometer liquid immiscible with the seal liquid and of different specific gravity, said reservoir communicating at one end with a seal liquid receiver, and at the other end to a manometer tube, the other end of said manometer tube in communication with the other receiver for seal liquid.

6. Apparatus according to claim 5, in which said manometer liquid is of lower specific gravity than the seal liquid, and said reservoir is connected between the upper end of the manometer tube and the upper receiver for seal liquid.

7. Apparatus according to claim 5, in which said manometer liquid is of higher specific gravity than the seal liquid, and said reservoir is connected between the lower end of the manometer tube and the lower receiver for seal liquid.

RUSSELL R. JOHNSON.

REFERENCES CITED

The following references are of record in the file of this patent:

UNITED STATES PATENTS

| Number | Name | Date |
| --- | --- | --- |
| 337,910 | Wilcox | Mar. 16, 1886 |
| 1,466,359 | Field | Aug. 28, 1923 |
| 1,567,758 | Schriever | Dec. 29, 1925 |
| 1,733,616 | McNeil | Oct. 29, 1929 |
| 1,902,276 | Bull | Mar. 21, 1933 |
| 2,158,785 | Hall | May 16, 1939 |
| 2,187,210 | McDonald | Jan. 16, 1940 |
| 2,525,807 | Lane | Oct. 17, 1950 |